United States Patent [19]
Zeltser

[11] Patent Number: 5,411,813
[45] Date of Patent: May 2, 1995

[54] FERHGASI SOFT MAGNETIC MATERIALS FOR INDUCTIVE MAGNETIC HEADS

[75] Inventor: Alexander M. Zeltser, San Diego, Calif.

[73] Assignee: Eastman Kodak Company, Rochester, N.Y.

[21] Appl. No.: 45,001

[22] Filed: Apr. 8, 1993

[51] Int. Cl.$^6$ ............................................. H01F 1/147
[52] U.S. Cl. ..................................... 428/606; 148/307; 420/82
[58] Field of Search ................... 148/307, 308; 420/82, 420/117; 428/606

[56] References Cited

U.S. PATENT DOCUMENTS

| | | | |
|---|---|---|---|
| 4,581,080 | 4/1986 | Meguro et al. | 420/82 |
| 4,683,012 | 7/1987 | Yamaguchi et al. | 148/301 |
| 4,766,039 | 8/1988 | Otomo et al. | 428/469 |
| 4,881,989 | 11/1989 | Yoshizawa et al. | 148/302 |
| 4,918,555 | 4/1990 | Yoshizawa et al. | 360/125 |
| 4,939,610 | 7/1990 | Narishige et al. | 360/126 |
| 4,943,879 | 7/1990 | Takano et al. | 360/126 |
| 4,953,050 | 8/1990 | Kumura et al. | 360/126 |
| 4,985,089 | 1/1991 | Yoshizawa et al. | 148/303 |
| 4,994,320 | 2/1991 | Jagielinski | 428/336 |
| 5,029,032 | 7/1991 | Yamada et al. | 360/126 |
| 5,162,960 | 11/1992 | Sakata et al. | 360/126 |

FOREIGN PATENT DOCUMENTS 55-73847  6/1980  Japan .

*Primary Examiner*—George Wyszomierski
*Attorney, Agent, or Firm*—William F. Noval

[57] ABSTRACT

A magnetic material comprised of FeRhGaSi containing Rhodium at a concentration of 1.0 to 6.0 atomic percent, has improved saturation magnetization and permeability acquired by magnetic annealing of sputtered FeRhGaSi in thin film form between 350° C. and 600° C. The FeRhGaSi material has an increased Curie temperature compared to FeGaSi material.

8 Claims, 5 Drawing Sheets

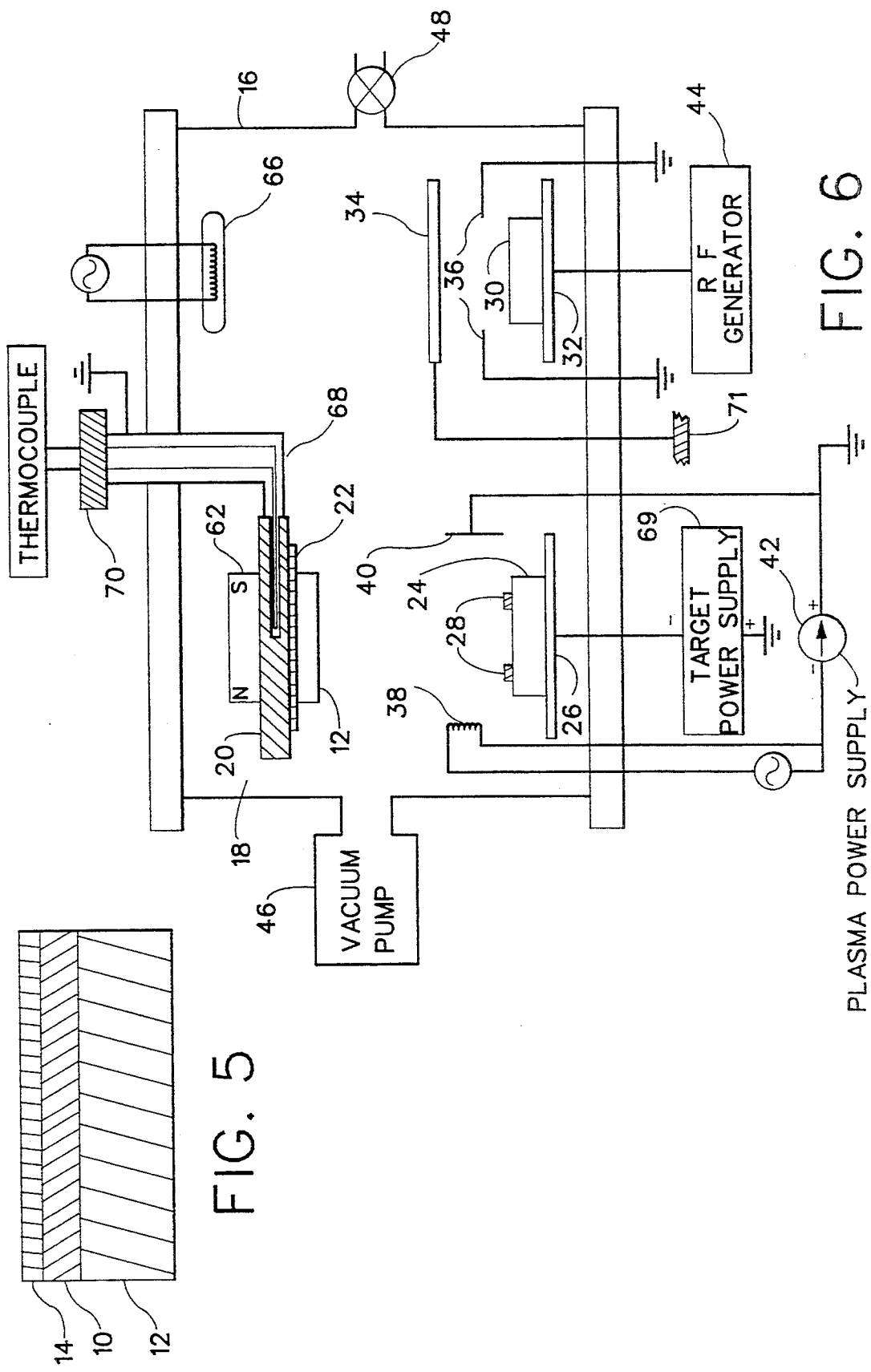

FERHGASI SOFT MAGNETIC MATERIALS FOR INDUCTIVE MAGNETIC HEADS

FIELD OF THE INVENTION

This invention relates generally to high density, high data rate recording systems such as modern rotary recorders and, more particularly, to magnetic alloys used in the fabrication of inductive metal laminated (ML) magnetic heads.

BACKGROUND OF THE INVENTION

High density, high data rate recording systems, such as video and data recorders, require head materials with a high saturation magnetization ($4\pi M_S$), high permeability ($\mu$) in the MHz frequency range, good tribological properties such as high wear resistance and high corrosion resistance.

Monolithic ferrite has been a material for record heads used in both magnetic disk and tape drives when the coercivity of the recording medium is less than 700 Oersteds (Oe) and the highest frequency is about ten megahertz (MHz). However, due to the need for high saturation magnetization and high frequency response, ferrite is not a good choice for newer applications.

Historically, Permalloy (NiFe) has been the magnetic material of choice for a record head of the thin film type. However, NiFe has poor wear resistance, and has a relatively low resistivity, causing permeability to decrease rapidly at higher frequencies due to eddy current losses.

Relative to monolithic ferrite, a sputter-deposited Sendust (FeSiAl) Alloy film offers a higher saturation magnetization, about 10 kilogauss (kG). Furthermore, a Sendust alloy has a relatively high resistivity and better wear resistance than Permalloy.

More recently, however, FeGaSi has been disclosed as a crystalline magnetic alloy having, compared to Sendust, both a higher saturation magnetization (about 13 kG) and lower coercivity (about 0.1 Oe). (See *Journal of Applied Physics*, Vol. 61, No. 8, Pages 3514 through 3519.) However, similar to Sendust, FeGaSi alloy films suffer from the disadvantage that their permeability, although almost constant in a range from 1 to 10 MHz, decreases rapidly for higher frequencies due to eddy current losses.

Following these developments, an FeGaSi-based alloy film having Ru as an additive is known in the art. FeRuGaSi has higher saturation magnetization than FeSiAl, although somewhat lower than FeGaSi, and an excellent soft magnetic property (low coercivity) and good wear resistance. This (FeRuGaSi) alloy was shown to be suitable for recording in a high frequency range near 100 MHz. (See *Journal of Applied Physics*, Vol. 64, No. 2, Pages 772 through 779.)

A need has therefore been felt for a magnetic core material which has as good or better soft magnetic properties (i.e., permeability and coercivity) than are currently available, but which (material) has an even higher saturation magnetization.

SUMMARY OF THE INVENTION

The present invention is directed to overcoming one or more of the problems set forth above. Briefly summarized, according to one aspect of the present invention, FeRhGaSi alloy films have been developed which have a higher saturation magnetization and excellent soft magnetic properties. The alloy has the composition $Fe_iRh_jGa_kSi_l$, where $69.0 \leq i \leq 80.0$; $1.0 \leq j \leq 6$; $4.0 \leq k \leq 8.0$; and $13.0 \leq l \leq 18.0$ in atomic percent.

This material advantageously provides a high saturation magnetization and superior permeability in the frequency range up to 200 MHz along with suitable tribological properties.

These and other aspects, objects, features and advantages of the present invention will be more clearly understood and appreciated from a review of the following detailed description of the preferred embodiments and appended claims, along with reference to the accompanying drawings.

BRIEF DESCRIPTION OF THE DRAWINGS

FIG. 5 is a cross-sectional view of a film of the FeRhGaSi material.

FIG. 6 is a diagram of the apparatus for deposition of a thin film by sputtering.

DETAILED DESCRIPTION OF THE INVENTION

In order to have a high linear recording density and a high data transfer rate, two inductive head material parameters are of particular importance: saturation magnetization and high-frequency permeability. An FeGaSi alloy film, whose composition is $Fe_{78.5}Ga_{6.8}Si_{14.7}$ (atomic percent), is known from the aforementioned *Journal of Applied Physics*, Vol. 61, No. 8 to have high saturation magnetic induction and soft magnetic properties, although the permeability does decrease rapidly for high frequencies due to eddy current losses.

By adding a small quantity of Rhodium (Rh) to FeGaSi, several important magnetic properties are improved relative to the magnetic properties of the base FeGaSi alloy. For example, relatively small additions of Rh (up to about six {6} atomic percent) to $Fe_{78.5}Ga_{6.8}Si_{14.7}$ materials create an FeRhGaSi film having, compared to the base alloy, improved saturation magnetization and high frequency permeability. Most importantly, these properties (saturation magnetization and permeability) are much better compared to FeRuGaSi alloy, which is a better material than FeGaSi due to its improved wear and corrosion resistance.

An FeRuGaSi alloy film, whose typical composition varies between $Fe_{72}Ru_4Ga_7Si_{17}$ and $Fe_{68}Ru_8Ga_7Si_{17}$ (atomic percent), is also known in the art to have a relatively high saturation flux density and excellent soft magnetic properties. As described in detail hereinbelow, after magnetic annealing in a certain temperature range, the FeRhGaSi material, when compared to FeRuGaSi, has a higher permeability, a similar coercivity, and a higher saturation magnetization and Curie temperature.

Figure 1:
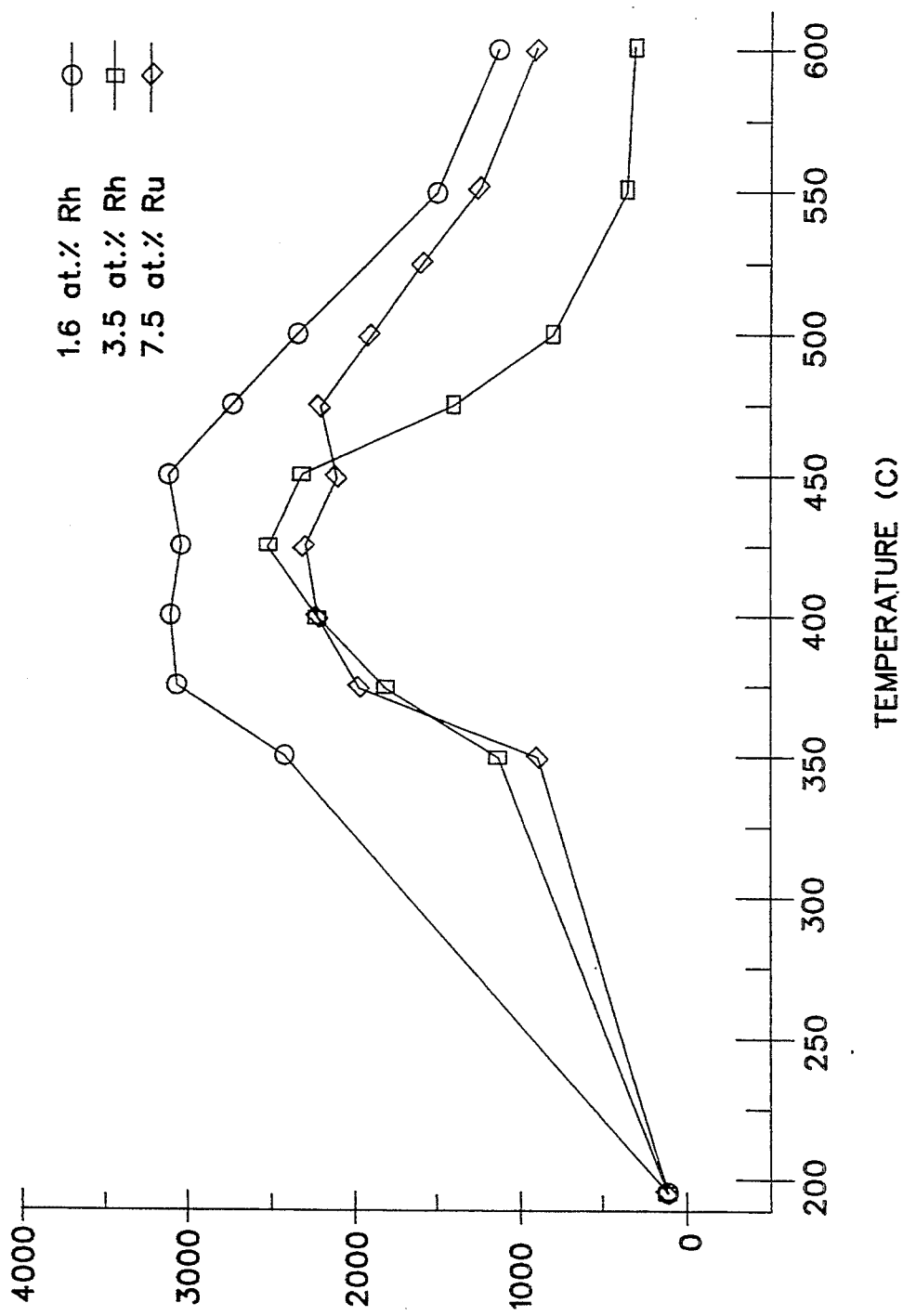
FIG. 1 shows the hard axis magnetic permeability of the FeRhGaSi alloy films at 10 MHz as a function of the annealing temperature $T_a$.

Permeability is one of the most important magnetic properties affecting head efficiency. Referring first to FIG. 1, the effect of the annealing temperature, $T_a$, on the magnetic permeability of the FeRhGaSi alloy films at 10 MHz, $\mu_{10}$, prepared by the sputtering technique is shown. After magnetic annealing between 350° and 475° C., the FeRhGaSi films attain $\mu_{10} = 1500$–$3000$.

Figure 2:
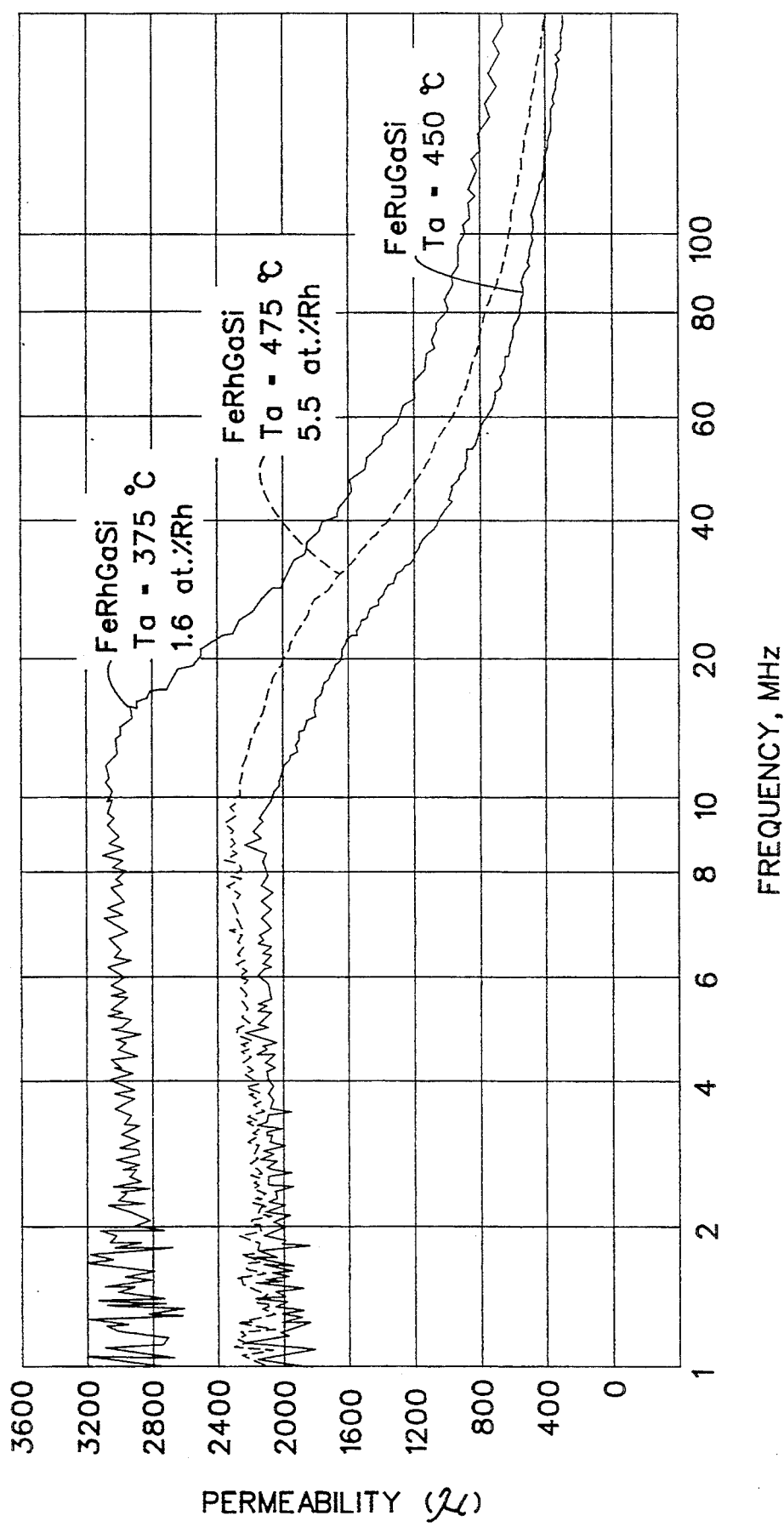
FIG. 2 illustrates the frequency dependence of the real part of the permeability $\mu$ for FeRhGaSi films.

FIG. 2 shows hard axis permeability as a function frequency of the FeRhGaSi films. The frequency dependence of permeability of a FeRuGaSi film material is also shown for comparison. FIG. 2 shows that after appropriate annealing temperature (See FIG. 1), alloy films containing between 1.6 and 5.5 atomic percent Rh exhibit a higher permeability in the frequency range up to 200 MHz than the FeRuGaSi.

Figure 3:
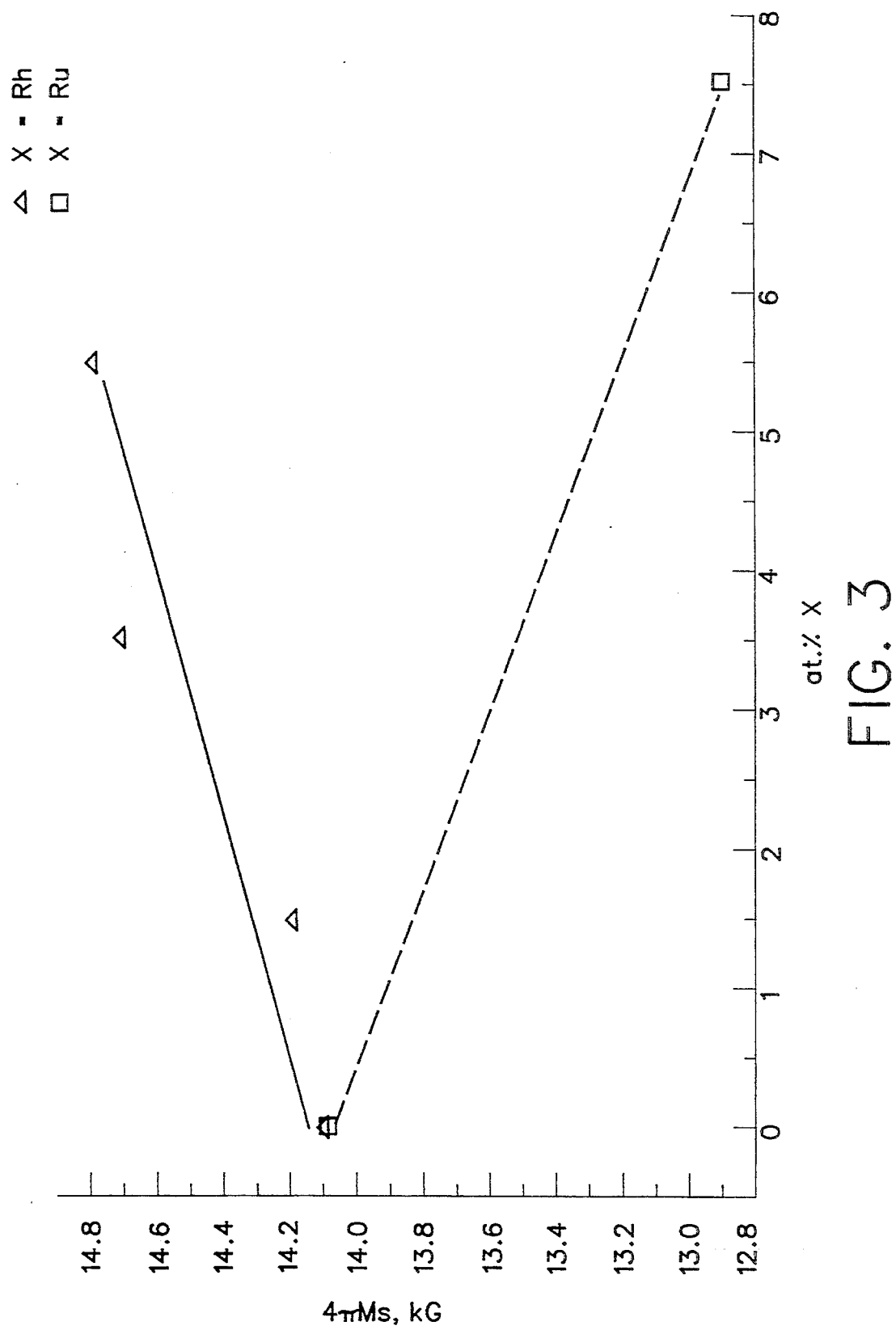
FIG. 3 is a plot of the saturation magnetization ($4\pi M_S$) at 5.0 kOe of the FeRhGaSi alloy films as function of Rhodium concentration.

A high saturation magnetization of the head material is necessary to record on a high coercivity media used for high density recording. The saturation magnetization of the FeRhGaSi films, as well as FeRuGaSi film, are also given in FIG. 3. The saturation magnetization is higher in films containing Rh compared to those containing Ru. Most importantly, addition of Rh to FeGaSi in the concentration range studied leads to the increase in $4\pi M_S$, whereas addition of Ru leads to a decrease in $4\pi M_S$ of films. This is a major advantage of an additive of Rh over an Ru additive.

Figure 4:
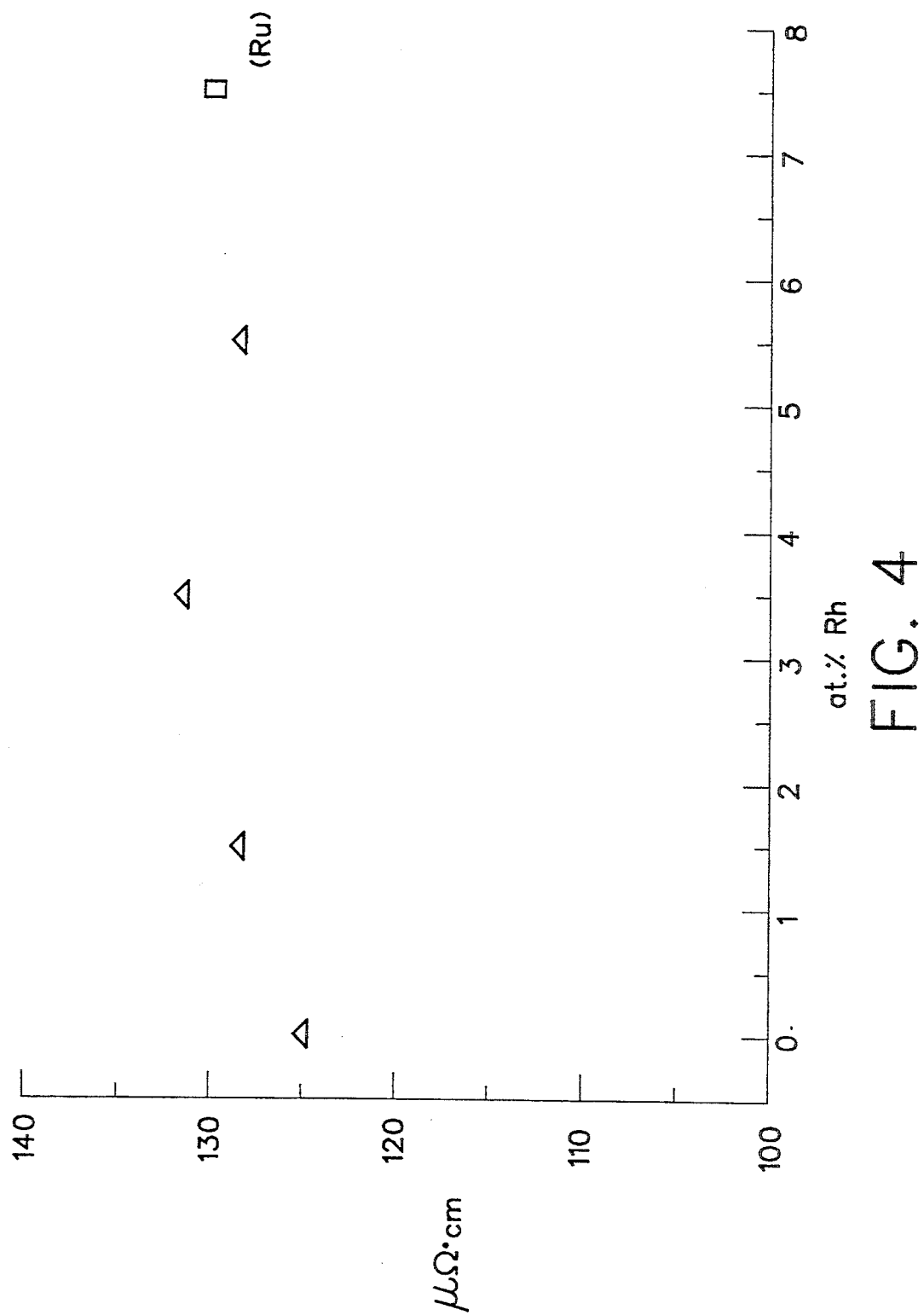
FIG. 4 is a plot of the resistivity of the FeRhGaSi films as a function of Rh content.

FIG. 4 shows that resistivity of FeRhGaSi and FeRuGaSi films is about the same, 130 $\mu\Omega$·cm, even though the former films have only up to 5.5 atomic percent of additive Rh.

FIG. 5 shows generally a thin film 10 of FeRhGaSi, in accordance with the invention, formed on a ceramic substrate 12 by a DC sputtering technique. After sputter deposition to a thickness of approximately 2 $\mu$m, the soft magnetic properties (permeability and coercivity) are provided by annealing the alloy film in a magnetic field of 150 Oe, at temperatures between 350° and 600° C. in steps of either 25° or 50° C. To that end, a protective layer of silicon dioxide (SiO$_2$) 14, deposited prior to annealing by means of an RF sputtering method to a thickness of approximately 0.1 $\mu$m, serves to protect the alloy film from oxidation during annealing.

FIG. 6 shows apparatus 16 for depositing the FeRhGaSi thin film 10 by sputtering. For that purpose, a sputtering chamber 18 includes an electrically conductive holder 20 to which a substrate 22, preferably silicon, is secured. The aforementioned ceramic substrate 12 is secured to the substrate 22, preferably by thermal conductive grease or paste.

FeRhGaSi is produced initially in sputtered form by simultaneously sputtering from a target of FeGaSi in bulk form and a target of Rh also in bulk form. For that purpose, a vacuum-cast target 24, comprised of an FeGaSi alloy of predetermined composition, is situated on an electrically conductive platform 26. Additionally, one of more thin sheet targets 28 of Rh are secured to the FeGaSi target 24, preferably by spot welding. The number of targets 28 and the composition of the FeGaSi target 24 are determined by the desired concentration of Rh and other elements (Fe,Ga,Si) in the resultant FeRhGaSi alloy to be formed.

In the presently preferred embodiment, the FeGaSi target is in the form of a disk having a diameter of approximately 5.7 cm and a thickness of about 0.6 cm; each Rh target is in the form of a 0.5 cm square, with a thickness of 0.25 mm. With targets of those dimensions, each Rh target 28 contributes about 1.6 to 1.8 atomic percent to the FeRhGaSi alloy formed. The targets 24 and 28 may be purchased from Mitsue Comtec Company of Saratoga, Calif. and Morton Thiokol, respectively.

A target 30, in the form of a SiO$_2$ wafer, disposed on an electrically conductive platform 32 inside the chamber 18, serves for sputtering the aforementioned protective layer 14 of SiO$_2$ onto FeRhGaSi while the latter is in its sputtered form. Shutter 34 associated with the targets for sputtering FeRhGaSi and SiO$_2$ films function, by means of mechanism 71, to allow the selection of the sputtering target.

The apparatus 16 further comprises a thermionic emitter 38 and an anode 40, to which is connected a DC plasma power supply 42, as shown. Separate sputtering mechanisms serve to knock out atoms from the combined targets 24 and 28 (FeGaSi and Rh), and molecules from the SiO$_2$ target 30. For sputtering FeRhGaSi, a high-voltage DC power source 69 is used to bias platform 26 strongly negative relative to the argon plasma.

To sputter from the SiO$_2$ target 30, on the other hand, an RF generator 44 is connected to the platform 32.

In order to sputter a thin film of FeRhGaSi, a vacuum pump 46 first evacuates the chamber 18. Then, argon gas is introduced into the chamber 18 through a valve 48. The argon in the chamber 18 becomes ionized when the power supply 42 applies voltage across the anode 40 and the emitter 38. The ionizing of the gas produces an argon plasma in the chamber 18.

When the shutter 34 uncovers the targets 24 and 28, positive argon ions accelerate toward the negatively biased electrically conductive platform 26, thereby simultaneously bombarding the FeGaSi target and the Rh target. This bombardment ejects atoms from the respective targets which deposit, in so-called sputtered form, as an alloy film of FeRhGaSi on the substrate 12. A permanent magnet 62 provides a field of a given intensity across the ceramic substrate 12 so that sputtered material is deposited in a direction that establishes an easy axis of the resultant alloy film.

When an alloy film of a desired thickness is formed, the DC power supplies 42 and 69 are disconnected from the anode 40, the emitter 38 and conductive platform 26, and the shutter 34 covers the targets 24 and 28. The feasible ranges of thickness using the sputtering technique described above is approximately 0.1 $\mu$m to 10 $\mu$m thickness (i.e. thin to thick film). The holder 20 is rotated into a new position above the platform 32 by means of mechanism 70. A protective layer of SiO$_2$ is then deposited on the sputtered film of FeRhGaSi. For that purpose, the generator 44 applies RF power to the electrically conductive platform 32. The RF generator 44 excites the plasma in the chamber 18 between the SiO$_2$ target 30 and the ground shield 36. Argon atoms of the plasma now bombard the target 30, thereby ejecting SiO$_2$ molecules which deposit on the FeRhGaSi alloy film covering the substrate 12.

A radiant lamp 66, located in the chamber 18 above platform 20 in its new position, functions as a heat source to heat the substrate 12 during RF sputtering of SiO$_2$. A conventional temperature-measuring device 68, such as a thermocouple, continuously monitors the temperature of the substrate 12.

The sputtering conditions for forming the thin film of FeRhGaSi and its protective layer of SiO$_2$ are as follows:

| | | |
|---|---|---|
| 1. | Chamber background pressure | $2.5 \times 10 - 7$ Torr |
| 2. | Argon pressure | $3 \times 10 - 3$ Torr |
| 3. | DC power | 300 Watts |
| 4. | FeRhGaSi deposition rate | 230 Å/Minute |
| 5. | SiO$_2$ deposition rate | 11 Å/Minute |

-continued

| | |
|---|---|
| 6. Ceramic substrate | MnNi Oxide |
| 7. Substrate temperature | |
| DC sputtering | Ambient |
| RF sputtering | 200° C. |
| 8. Magnetic Field | 200 Oe |

The Rhodium element belongs to the same group of elements as platinum, ruthenium and iridium. These elements exhibit many similarities in their physical and chemical properties. For example, when rhodium is added to the Fe3Si-type alloys, the element substitutes for an iron atom on one of the two iron lattice sites with the lower magnetic moment. As is the situation with iridium, rhodium is known to improve the corrosion and wear properties of electrical contact alloys. We found that the addition of rhodium enhances the high frequency permeability saturation magnetization and the resistivity of FeGaSi alloy films. High electrical resistivity ($\rho > 10^2$ $\mu\Omega$·cm) is critical for high frequency materials since it reduces negative effect of eddy currents, which adversely affect permeability at high frequencies. As shown in FIG. 5, the FeRhGaSi alloy films prepared by DC triode-magnetron sputtering technique have a resistivity of 129-132 $\mu\Omega$·cm, or about the same as in the best FeRuGaSi films.

A high Curie temperature, $T_c$, is also desirable for a head material from the point of view of thermal stability of magnetic properties during head fabrication and subsequent usage. The $T_c$ of various FeRhGaSi films as well as FeGaSi and FeRuGaSi films are given in Table I.

TABLE I

| Film | Fe (at. %) | X (at. %) | Ga (at. %) | Si (at. %) | $T_c$ (°C.) |
|---|---|---|---|---|---|
| FeGaSi | 78.5 | 0.0 | 6.8 | 14.7 | 558 |
| FeRhGaSi | 77.8 | 0.5 | 6.4 | 15.2 | 562 |
| FeRhGaSi | 77.0 | 1.6 | 6.4 | 15.0 | 574 |
| FeRhGaSi | 76.1 | 2.6 | 6.5 | 14.9 | 583 |
| FeRuGaSi | 72.2 | 7.5 | 5.8 | 14.5 | 545 |

As shown, the addition to an FeGaSi film of Rh up to about 2.6 atomic percent increases Curie temperature, and the $T_c$ of an FeRhGaSi film is higher than the $T_c$ of an FeRuGaSi film.

Various samples of FeRhGaSi have been investigated having Fe as the major component on the basis of atomic percent. When expressed as $Fe_iRh_jGa_kSi_l$, wherein i, j, k, and l denote concentration in atomic percent, it is contemplated that FeRhGaSi, in accordance with the invention, should satisfy the following relationships:

69.0≦i≦80.0
1.0≦j≦6.0
4.0≦k≦8.0
13.0≦l≦18.0
i+j+k+l=100

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

The invention has been described in detail with reference to the figures; however, it will be appreciated that variations and modifications are possible within the spirit and scope of the invention.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

PARTS LIST

10 Thin film
12 Ceramic substrate
14 Protective layer
16 Apparatus for depositing the thin film
18 Sputtering chamber
20 Holder
22 Substrate
24 Target
26 Platform
28 Target
30 Target
32 Platform
34 Shutter
36 Shield
38 Thermionic emitter
40 Anode
42 Power supply
44 Generator
46 Vacuum pump
48 Valve
62 Permanent magnet
66 Radiant lamp
68 Measuring device
69 Power supply
71 Mechanism

What is claimed is:

1. A soft magnetic material in a thickness range of 0.1 microns to 10 microns and said magnetic material consisting of:

$Fe_iRh_jGa_kSi_l$, where i, j, k, and l denote the concentrations in atomic percent, the concentrations being:

69.0<i≦80.0
1.0≦j≦6.0
4.0≦k≦8.0
13.0≦l≦18.0
i+j+k+l=100 wherein said Rh is present in an amount effective to increase the saturation magnetization of said material.

2. The $Fe_iRh_jGa_kSi_l$ soft magnetic film material of claim 1 which has been produced by magnetic annealing of sputtered FeRhGaSi alloys in film form at temperatures between 350° C. and 600° C. so as to improve soft magnetic properties thereof.

3. The $Fe_iRh_jGa_kSi_l$ soft magnetic film material of claim 1 wherein Fe and Rh are present in proportions such that increasing the concentration of Rh and decreasing the concentration of Fe increases the high frequency permeability and saturation magnetization of said magnetic material.

4. The $Fe_iRh_jGa_kSi_l$ soft magnetic film material according to claim 1 wherein Rh is present in an amount sufficient to improve the Curie temperature and saturation magnetization of said magnetic material.

5. The $Fe_iRh_jGa_kSi_l$ soft magnetic film material according to claim 1, wherein said thickness ranges from 0.1 microns to 1.00 micron.

6. The $Fe_iRh_jGa_kSi_l$ soft magnetic film material according to claim 1, wherein said thickness ranges from more than 1 micron to 10 microns.

7. An FeGaSi-based magnetic material consisting of Fe, Ga, Si, and Rh as indispensable elements wherein Rh is present in concentrations of 1.0 to 6.0 atomic percent, Fe is present at a concentration in excess of 69.0 atomic percent, Si is present at a concentration of at least twice the atomic percent of Ga, and Rh is present in an amount sufficient to improve the high frequency permeability and saturation magnetization of said magnetic material.

8. A magnetic head comprising
a nonmagnetic substrate; and
a soft magnetic material on said substrate having a thickness of 0.1 micron to 10 microns; said magnetic material consisting of
$Fe_iRh_jGa_kSi_l$, where i, j, k, and 1 denote the concentrations in atomic percent, the concentration being within the following ranges:
$69.0 \leq i \leq 80.0$
$1.0 \leq j \leq 6.0$
$4.0 \leq k \leq 8.0$
$13.0 \leq l \leq 18.0$
and $i+j+k+l=100$;
wherein said Rh is present in an amount effective to increase the saturation magnetization of said material; and
wherein said soft magnetic material has been annealed at a temperature between about 350° C. and 600° C. so as to improve the saturation magnetization of said magnetic head.

* * * * *